United States Patent
Xu et al.

(10) Patent No.: US 10,809,845 B2
(45) Date of Patent: Oct. 20, 2020

(54) TOUCH UNIT, METHOD FOR MANUFACTURING THE SAME AND TOUCH DISPLAY PANEL

(71) Applicants: BOE TECHNOLOGY GROUP CO., LTD., Beijing (CN); Hefei Xinsheng Optoelectronics Technology Co., Ltd., Hefei (CN)

(72) Inventors: Zouming Xu, Beijing (CN); Ming Hu, Beijing (CN); Ming Zhang, Beijing (CN); Jing Wang, Beijing (CN); Guiyu Zhang, Beijing (CN)

(73) Assignees: BOE TECHNOLOGY GROUP CO., LTD., Beijing (CN); HEFIE XINSHEND OPTOELECTRONICS TECHNOLOGY CO., LTD., Anhui (CN)

( * ) Notice: Subject to any disclaimer, the term of this patent is extended or adjusted under 35 U.S.C. 154(b) by 277 days.

(21) Appl. No.: 15/750,521

(22) PCT Filed: Jul. 19, 2017

(86) PCT No.: PCT/CN2017/093519
§ 371 (c)(1),
(2) Date: Feb. 6, 2018

(87) PCT Pub. No.: WO2018/045828
PCT Pub. Date: Mar. 15, 2018

(65) Prior Publication Data
US 2020/0089359 A1 Mar. 19, 2020

(30) Foreign Application Priority Data
Sep. 9, 2016 (CN) .......................... 2016 1 0814460

(51) Int. Cl.
*G06F 3/041* (2006.01)

(52) U.S. Cl.
CPC .. *G06F 3/0416* (2013.01); *G06F 2203/04103* (2013.01); *G06F 2203/04111* (2013.01); *G06F 2203/04114* (2019.05)

(58) Field of Classification Search
CPC ........... G06F 3/044; G06F 2203/04111; G06F 2203/04103
(Continued)

(56) References Cited

U.S. PATENT DOCUMENTS 8,717,333 B2 * 5/2014 Ozeki ..................... G06F 3/044
345/174
9,535,543 B2 * 1/2017 Lee ......................... G06F 3/044
(Continued)

FOREIGN PATENT DOCUMENTS

CN 104461109 A 3/2015
CN 105446570 A 3/2016
(Continued)

OTHER PUBLICATIONS

Search Report and Written Opinion for International Application No. PCT/CN2017/093519 dated Oct. 25, 2017.

Primary Examiner — Koosha Sharifi-Tafreshi
(74) Attorney, Agent, or Firm — Calfee, Halter & Griswold LLP (57) ABSTRACT

The present disclosure provides a touch unit, a method for manufacturing the same and a touch display panel. The touch unit includes: at least two sub-units arranged in an array on a base substrate, each of the sub-units including: a first electrode and a second electrode formed on the base substrate, an initial insulation layer being formed between the first electrode and the second electrode, wherein an orthographic projection area of the first electrode on the second electrode is located within an orthographic projection area of the initial insulation layer on the second electrode, the first electrodes in each row of the sub-units are
(Continued)

sequentially connected to form a first touch line, the second electrodes in each column of the sub-units are sequentially connected to form a second touch line, and each of the first touch lines and each of the second touch lines are connected to a control unit.

18 Claims, 6 Drawing Sheets

(58) Field of Classification Search
USPC .................................................. 345/173–174
See application file for complete search history.

(56) References Cited

U.S. PATENT DOCUMENTS

| | | | |
|---|---|---|---|
| 9,626,052 B2 | 4/2017 | Lu et al. | |
| 10,318,049 B2* | 6/2019 | Ahn | G06F 3/0412 |
| 2010/0156811 A1* | 6/2010 | Long | G06F 3/044 |
| | | | 345/173 |
| 2010/0214232 A1* | 8/2010 | Chan | G06F 3/044 |
| | | | 345/173 |
| 2011/0102363 A1* | 5/2011 | Yang | G06F 3/044 |
| | | | 345/174 |
| 2011/0290547 A1* | 12/2011 | Chen | G06F 3/044 |
| | | | 174/261 |
| 2012/0026128 A1* | 2/2012 | Chen | G06F 3/044 |
| | | | 345/174 |
| 2012/0146942 A1* | 6/2012 | Kamoshida | G06F 3/044 |
| | | | 345/174 |
| 2013/0256008 A1* | 10/2013 | Zeng | H01H 11/00 |
| | | | 174/257 |
| 2013/0301196 A1* | 11/2013 | Miyazaki | H05K 7/02 |
| | | | 361/679.01 |
| 2014/0160072 A1* | 6/2014 | Inagaki | G06F 3/0418 |
| | | | 345/174 |
| 2015/0075959 A1 | 3/2015 | Lu et al. | |
| 2015/0355758 A1* | 12/2015 | Zhang | G06F 3/0416 |
| | | | 345/174 |
| 2017/0192558 A1 | 7/2017 | Xi et al. | |

FOREIGN PATENT DOCUMENTS

| | | |
|---|---|---|
| CN | 105609037 A | 5/2016 |
| CN | 106293250 A | 1/2017 |

* cited by examiner

TOUCH UNIT, METHOD FOR MANUFACTURING THE SAME AND TOUCH DISPLAY PANEL

CROSS-REFERENCE TO RELATED APPLICATIONS

The present application is based upon International Application No. PCT/CN2017/093519, filed on Jul. 19, 2017, which is based upon and claims priority to Chinese Patent Application No. 201610814460.7, titled "TOUCH UNIT, METHOD FOR MANUFACTURING THE SAME AND TOUCH DISPLAY PANEL" filed on Sep. 9, 2016, the entire contents of which are incorporated herein by reference.

TECHNICAL FIELD

The present disclosure relates to the field of touch display technology, and more particularly, to a touch unit, a method for manufacturing the same and a touch display panel.

BACKGROUND

With the development of touch display technology, touch display panels are increasingly used in electronic products such as touch screen mobile phones or tablets. The touch display panel not only has a display function but also has a touch function. Currently, the touch display panel generally includes a base substrate and a plurality of touch units arranged in an array on the base substrate.

In the related art, the touch unit may include a first electrode and a second electrode that are vertically disposed, and an insulation layer is disposed between the first electrode and the second electrode, and the first electrodes in each row of the touch units are connected to form a touch driving line, the second electrodes in each column of the touch units are connected to form a touch sensing line. One touch driving line and one touch sensing line correspond to one touch unit, and all the touch driving lines and all the touch sensing lines on the touch display panel are connected to a control unit. When a touch function of the touch display panel is implemented, the control unit may sequentially apply a driving voltage to each touch driving line. When a driving voltage is applied to a certain touch driving line, an induced voltage on each touch sensing line is collected. If the induced voltage on a certain touch sensing line is a preset voltage, the control unit may determine that a region where the touch unit corresponding to the touch driving line and the touch sensing line is located on the touch display panel is not touched. If the induced voltage on a certain touch sensing line is not the preset voltage, the control unit may determine that the region where the touch unit corresponding to the touch driving line and the touch sensing line is located on the touch display panel is touched. Then, the touch display panel is controlled to display a corresponding image according to the position of the touched region of the touch display panel on the touch display panel.

In the related art, the first electrode and the second electrode have only one electrode intersection point in the region on the touch display panel where the touch unit is located. When a region within the region where the touch unit is located except the electrode intersection point is touched, the voltage of the second electrode collected on the touch sensing line is still a preset voltage. Therefore, effective touch cannot be performed, and the accuracy of touch is low.

SUMMARY

The present disclosure provides a touch unit, a method for manufacturing the same and a touch display panel.

According to a first aspect, there is provided a touch unit, including: at least two sub-units arranged in an array on a base substrate, each of the sub-units including: a first electrode and a second electrode formed on the base substrate, an initial insulation layer being formed between the first electrode and the second electrode, wherein an orthographic projection area of the first electrode on the second electrode is located within an orthographic projection area of the initial insulation layer on the second electrode, wherein the first electrodes in each row of the sub-units are sequentially connected to form a first touch line, the second electrodes in each column of the sub-units are sequentially connected to form a second touch line, and each of the first touch lines and each of the second touch lines are connected to a control unit.

In an embodiment, a lengthwise direction of the first electrode is perpendicular to a lengthwise direction of the second electrode.

In an embodiment, the touch unit further includes: a first connection line and a second connection line formed on the base substrate, and one end of each of the first touch lines in the touch unit is connected to the control unit through the first connection line, and one end of each of the second touch lines in the touch unit is connected to the control unit through the second connection line.

In an embodiment, the second electrode includes:

two second sub-electrodes and a conductive bridge, the two second sub-electrodes being respectively located at two sides of the first electrode and respectively connected to two ends of the conductive bridge.

In an embodiment, each of the first electrode, the conductive bridge and the second sub-electrode includes a transparent conductive material.

In an embodiment, the touch unit includes: nine sub-units arranged in an array on the base substrate, the nine sub-units being arranged in three rows and three columns.

In an embodiment, the touch unit has an area of 25 mm².

In an embodiment, each of the first electrode and the second electrode has a thickness of 200 Å to 1500 Å.

In an embodiment, the initial insulation layer has a thickness of 1.5 μm to 2.5 μm.

In an embodiment, each of the first connection line and the second connection line has a thickness of 1000 Å to 4000 Å.

In an embodiment, the touch unit further includes: an auxiliary insulation layer covering on the at least two sub-units, the first connection line and the second connection line.

According to a second aspect, there is provided a touch display panel, including: a base substrate, and a plurality of touch units, according to the first aspect, formed in an array on the base substrate.

According to a third aspect, there is provided a method for manufacturing a touch unit, including:

forming at least two sub-units arranged in an array on a base substrate, each of the sub-units including: a first electrode and a second electrode formed on the base substrate, an initial insulation layer being formed between the first electrode and the second electrode, wherein an orthographic projection area of the first electrode on the second electrode is located within an orthographic projection area of the initial insulation layer on the second electrode, the first electrodes in each row of the sub-units are sequentially connected to form a first touch line, and the second electrodes in each column of the sub-units are sequentially connected to form a second touch line;

connecting each of the first touch lines to a control unit; and connecting each of the second touch lines to the control unit.

In an embodiment, a lengthwise direction of the first electrode is perpendicular to a lengthwise direction of the second electrode.

In an embodiment, the forming at least two sub-units arranged in an array on a base substrate includes:

forming a conductive bridge pattern on the base substrate, the conductive bridge pattern including n conductive bridges, n being an integer greater than or equal to 2;

forming the initial insulation layers on the base substrate on which the n conductive bridges are formed; and forming an electrode pattern on the base substrate on which the initial insulation layers are formed, the electrode pattern including n first electrodes and 2n second sub-electrodes, each of the first electrodes corresponding to one conductive bridge and two second sub-electrodes respectively, wherein each of the sub-units comprises one first electrode, one conductive bridge and two second sub-electrodes, the two second sub-electrodes are respectively located at two sides of the one first electrode, and two ends of the one conductive bridge are respectively connected to the two second sub-electrodes to form a preset second electrode.

In an embodiment, the forming at least two sub-units arranged in an array on a base substrate includes:

forming an electrode pattern on the base substrate, the electrode pattern including n first electrodes and 2n second sub-electrodes, each of the first electrodes corresponding to two of the second sub-electrodes, n being an integer greater than or equal to 2;

forming the initial insulation layers on the base substrate on which the electrode pattern is formed; and forming a conductive bridge pattern on the base substrate on which the initial insulation layers are formed, the conductive bridge pattern including n conductive bridges and the n conductive bridges corresponding to the n first electrodes respectively, wherein each of the sub-units comprises one first electrode, one conductive bridge and two second sub-electrodes, the two second sub-electrodes are respectively located at two sides of the one first electrode, and two ends of the one conductive bridge are respectively connected to the two second sub-electrodes to form a preset second electrode.

In an embodiment, the connecting each of the first touch lines to a control unit includes:

forming a first connection line on the base substrate on which the at least two sub-units are formed, the first connection line connecting one end of each of the first touch lines to the control unit; and the connecting each of the second touch lines to the control unit includes:

forming a second connection line on the base substrate on which the at least two sub-units are formed, the second connection line connecting one end of each of the second touch lines to the control unit.

In an embodiment, the forming at least two sub-units arranged in an array on a base substrate includes:

forming nine sub-units arranged in an array on the base substrate, the nine sub-units being arranged in three rows and three columns.

In an embodiment, the method further includes:

covering an auxiliary insulation layer on the at least two sub-units, the first connection line and the second connection line.

BRIEF DESCRIPTION OF THE DRAWINGS

In order to describe the technical solutions in the embodiments of the present disclosure more clearly, the accompanying drawings required for describing the embodiments will be briefly introduced in the following. Apparently, the accompanying drawings in the following description are merely some embodiments of the present disclosure. For those skilled in the art, other drawings may also be obtained based on these drawings without creative labor.

DETAILED DESCRIPTION

To make the objectives, technical solutions and advantages of the present disclosure more clear, embodiments of the present disclosure will be further described in detail below with reference to the accompanying drawings.

Figure 1:
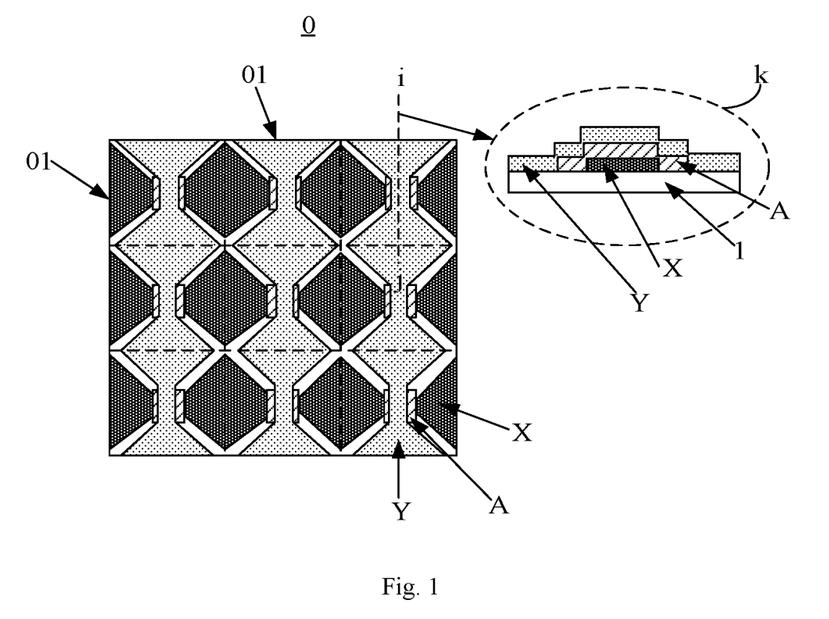
FIG. 1 is a schematic structural diagram of a touch unit according to an embodiment of the present disclosure.

As shown in FIG. 1, an embodiment of the present disclosure provides a touch unit 0. The touch unit 0 may include: at least two sub-units 01 arranged in an array on a base substrate 1. The k-region in FIG. 1 shows a section of one sub-unit along a cutting line ij.

Each of the sub-units 01 may include: a first electrode X and a second electrode Y formed on the base substrate 1. An initial insulation layer A is formed between the first electrode X and the second electrode Y, wherein an orthographic projection area of the first electrode X on the second electrode Y is located within an orthographic projection area of the initial insulation layer A on the second electrode Y.

In the embodiment, the first electrodes X in each row of the sub-units 01 are sequentially connected to form a first touch line, the second electrodes Y in each column of the sub-units 01 are sequentially connected to form a second touch line, and each of the first touch lines and each of the second touch lines are connected to a control unit (not shown in FIG. 1).

To sum up, embodiments of the present disclosure provide a touch unit. The touch unit includes at least two sub-units. Each of the sub-units includes a first electrode and a second electrode. An initial insulation layer is formed between the first electrode and the second electrode. Each of the first touch lines and each of the second touch lines are connected to a control unit. The number of intersection points of the first electrode and the second electrode in the touch unit is increased, and the number of electrodes capable of generating an induced voltage in the touch unit is increased. When a region except a certain electrode intersection point within the region where the touch unit is located is touched, the induced voltage generated on an electrode at other electrode intersection point is different from the preset voltage. The induced voltage collected from the touch sensing line is different from the preset voltage, so that the touch may be effectively performed and the accuracy of the touch is improved.

In an embodiment of the present disclosure, a lengthwise direction of the first electrode X may have an included angle with a lengthwise direction of the second electrode Y, so that the first electrode X has an orthographic projection area on the second electrode Y (that is, an orthographic projection area of the first electrode X on a plane where the second electrode Y is located is located on the second electrode Y). In an embodiment, the lengthwise direction of the first electrode X is perpendicular to the lengthwise direction of the second electrode Y. That is, the included angle between the lengthwise direction of the first electrode X and the lengthwise direction of the second electrode Y is 90 degrees.

Exemplarily, the control unit in the embodiment of the present disclosure may be the same as the Bonding lead. The touch unit 01 may include: nine sub-units 01 arranged in an array on the base substrate 1, the nine sub-units 01 being arranged in three rows and three columns. That is, the nine sub-units 01 may include three rows of sub-units and three columns of sub-units. The touch unit 01 may have an area of 25 mm$^2$ (square millimeter). That is, the touch unit 01 may be a square with a side length of 5 mm (millimeter).

Figure 2:
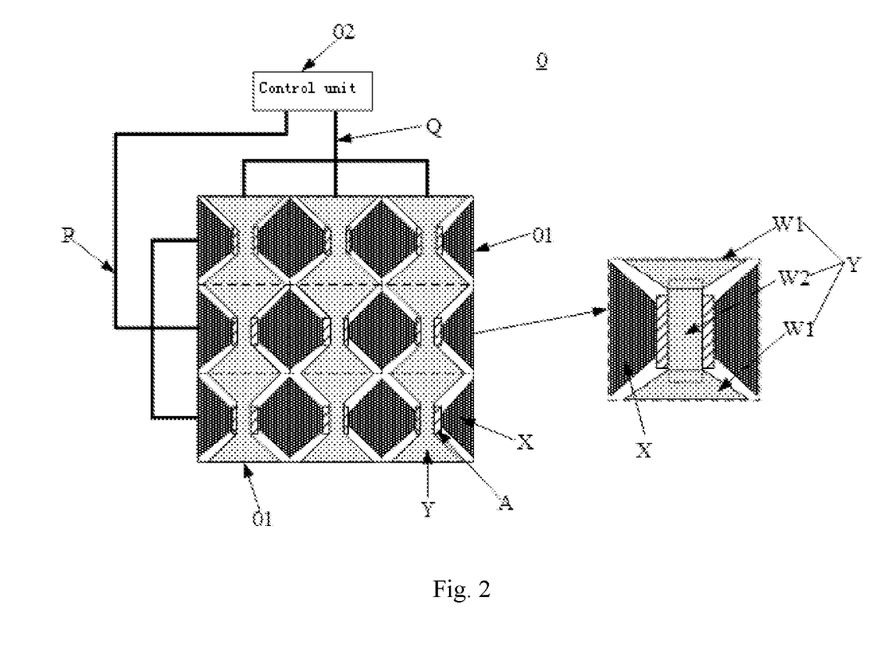
FIG. 2 is another schematic structural diagram of a touch unit according to an embodiment of the present disclosure.

As shown in FIG. 2, an embodiment of the present disclosure provides another touch unit 0. On the basis of FIG. 1, the touch unit 0 may further include: a first connection line P and a second connection line Q formed on the base substrate 1. One end of each of the first touch lines in the touch unit 0 is connected to the control unit 02 through the first connection line P, and one end of each of the second touch lines in the touch unit 0 is connected to the control unit 02 through the second connection line Q.

The touch unit 0 includes a plurality of first touch lines and a plurality of second touch lines, the plurality of first touch lines are connected to each other and connected to the control unit 02 through the first connection line P, and the plurality of second touch lines are connected to each other and connected to the control unit 02 through the second connection line Q. That is, one touch unit 0 corresponds to only two connection lines connected to the control unit 02. The number of the connection lines in the touch display panel where the touch unit 0 is located is small and the area occupied by the same on the touch display panel is small. Therefore, the touch display panel in which the touch unit 0 is located may have the characteristics of a narrow bezel.

The second electrode Y may include: two second sub-electrodes W1 and a conductive bridge W2. The two second sub-electrodes W1 are respectively located at two sides of the first electrode X and respectively connected to two ends of the conductive bridge W2.

Each of the first electrode X, the conductive bridge W2 and the second sub-electrode W1 may include a transparent conductive material. For example, the materials of the first electrode X and the second electrode W1 may be Indium Tin Oxides (ITO), Metal Mesh, or graphene. The material of the conductive bridge W2 may be ITO or zinc oxide (ZnO). Each of the first electrode X and the second electrode Y may have a thickness of 200 Å (angstroms) to 1500 Å. It should be noted that 1 Å is equal to $10^{-10}$ m. The initial insulation layer A may have a thickness of 1.5 μm (micron) to 2.5 μm. Each of the first connection line P and the second connection line Q may have a thickness of 1000 Å to 4000 Å.

Further, the touch unit 0 may further include: an auxiliary insulation layer (not shown in FIG. 2) covering on the at least two sub-units 01, the first connection line P and the second connection line Q. Since the touch unit 0 further includes the auxiliary insulation layer and the auxiliary insulation layer covers the at least two sub-units 01, the first connection line P and the second connection line Q, the auxiliary insulation layer may play a protective role for the at least two sub-units 01, the first connection line P and the second connection line Q. The material of the auxiliary insulation layer may be an organic coating, such as the same material as the over cover (OC), or the material of the auxiliary insulation layer may also be an inorganic material, such as $SiO_2$ (silicon dioxide).

Generally, an One Glass Solution (OGS) touch display panel is widely used due to its good touch performance, light weight and thinness. A finger or a touch pen may be used on the touch display panel for touch, and it is more and more popular among people to use the touch pen to perform touch on the touch display panel. However, since a tip of the touch pen is thin, a contact area of the tip of the touch pen with the touch display panel is a circle with a diameter less than 2 mm. Therefore, an area corresponding to each electrode intersection point in this case is required to be smaller, which generally may be a circle with a diameter less than 4 mm. In addition, generally, only one first electrode and one second electrode are included in one touch unit. That is, one touch unit only includes one electrode intersection point. When the first electrode and the second electrode fail, the region on the touch display panel corresponding to the touch unit cannot achieve effective touch. However, the touch unit provided by the embodiment of the present disclosure includes at least two sub-units. That is, the touch unit includes at least two electrode intersection points. When a certain sub-unit fails, other sub-units may still operate normally, and the region on the touch display panel corresponding to the touch unit may still achieve effective touch.

To sum up, embodiments of the present disclosure provide a touch unit. The touch unit includes at least two sub-units. Each of the sub-units includes a first electrode and a second electrode. An initial insulation layer is formed between the first electrode and the second electrode. Each of the first touch lines and each of the second touch lines are connected to a control unit. The number of intersection points of the first electrode and the second electrode in the touch unit is increased, and the number of electrodes capable of generating an induced voltage in the touch unit is increased. When a region except a certain electrode intersection point within the region where the touch unit is located is touched, the induced voltage generated on an electrode at other electrode intersection point is different from the preset voltage. The induced voltage collected from the touch sensing line is different from the preset voltage, so that the touch may be effectively performed and the accuracy of the touch is improved.

Figure 3:
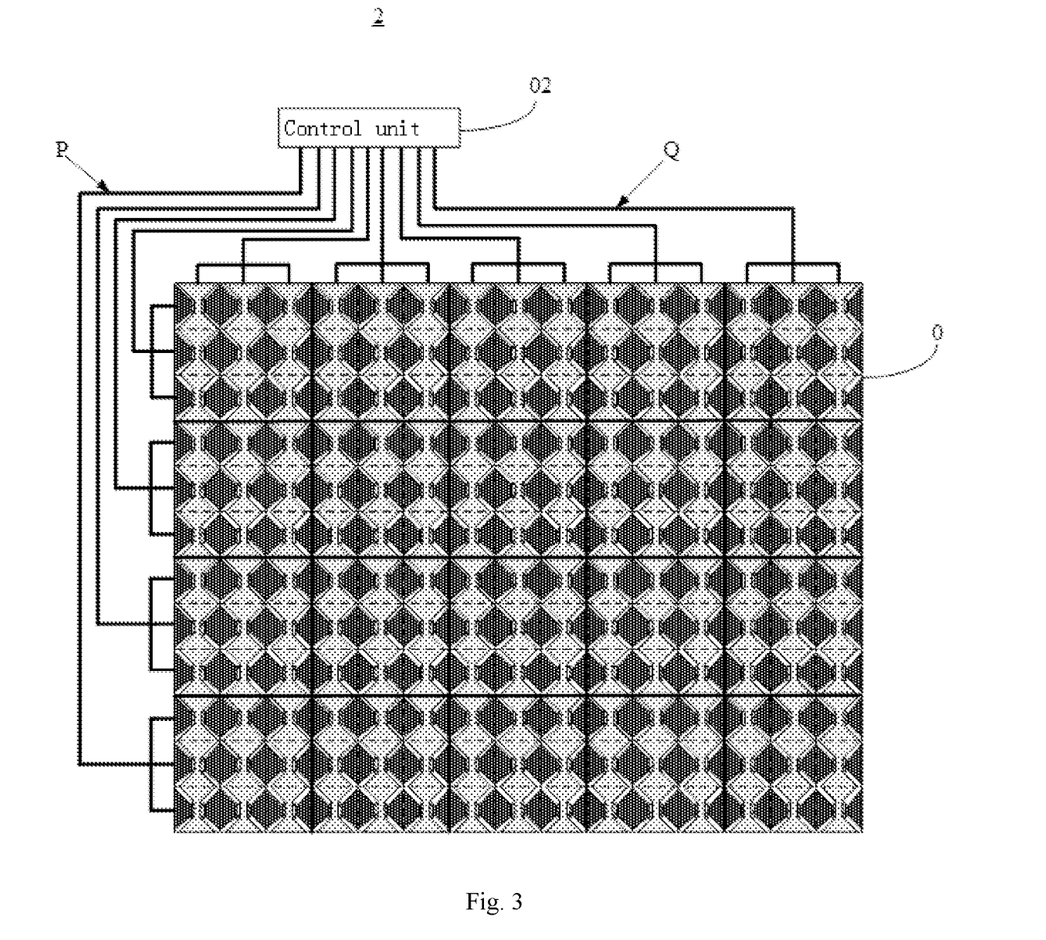
FIG. 3 is a schematic structural diagram of a touch display panel according to an embodiment of the present disclosure.

As shown in FIG. 3, an embodiment of the present disclosure provides a touch display panel 2. The touch display panel 2 may include: a base substrate (not shown in FIG. 3), and a plurality of touch units 0 formed in an array on the base substrate. The touch unit 0 may be the touch unit 0 as shown in FIG. 1 or FIG. 2. In an embodiment, the touch display panel 2 may further include a control unit 02.

Each row of touch units 0 may include three rows of sub-units, and the first electrodes in each row of sub-units are sequentially connected together. Each column of touch units 0 may include three columns of sub-units, and the second electrodes in each column of sub-units are sequentially connected together.

To sum up, embodiments of the present disclosure provide a touch display panel. A touch unit in the touch display panel includes at least two sub-units. Each of the sub-units includes a first electrode and a second electrode. An initial insulation layer is formed between the first electrode and the second electrode. Each of the first touch lines and each of the second touch lines are connected to a control unit. The number of intersection points of the first electrode and the second electrode in the touch unit is increased, and the number of electrodes capable of generating an induced voltage in the touch unit is increased. When a region except a certain electrode intersection point within the region where the touch unit is located is touched, the induced voltage generated on an electrode at other electrode intersection point is different from the preset voltage. The induced voltage collected from the touch sensing line is different from the preset voltage, so that the touch may be effectively performed and the accuracy of the touch is improved.

Figure 4:
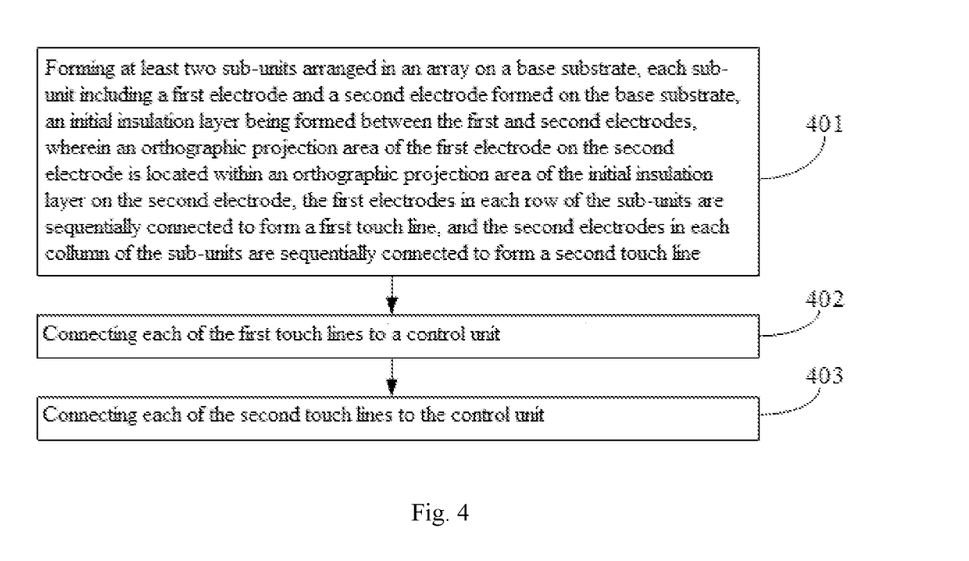
FIG. 4 is a flow chart of a method for manufacturing a touch unit according to an embodiment of the present disclosure.

As shown in FIG. 4, an embodiment of the present disclosure provides a method for manufacturing a touch unit, which may include:

step 401: forming at least two sub-units arranged in an array on a base substrate, each of the sub-units including: a first electrode and a second electrode formed on the base substrate, an initial insulation layer being formed between the first electrode and the second electrode, wherein an orthographic projection area of the first electrode on the second electrode is located within an orthographic projection area of the initial insulation layer on the second electrode, the first electrodes in each row of the sub-units are sequentially connected to form a first touch line, and the second electrodes in each column of the sub-units are sequentially connected to form a second touch line;

step 402: connecting each of the first touch lines to a control unit;

step 403: connecting each of the second touch lines to the control unit.

To sum up, embodiments of the present disclosure provide a method for manufacturing a touch unit. The touch unit manufactured through the method includes at least two sub-units. Each of the sub-units includes a first electrode and a second electrode. An initial insulation layer is formed between the first electrode and the second electrode. Each of the first touch lines and each of the second touch lines are connected to a control unit. The number of intersection points of the first electrode and the second electrode in the touch unit is increased, and the number of electrodes capable of generating an induced voltage in the touch unit is increased. When a region except a certain electrode intersection point within the region where the touch unit is located is touched, the induced voltage generated on an electrode at other electrode intersection point is different from the preset voltage. The induced voltage collected from the touch sensing line is different from the preset voltage, so that the touch may be effectively performed and the accuracy of the touch is improved.

Figure 5:
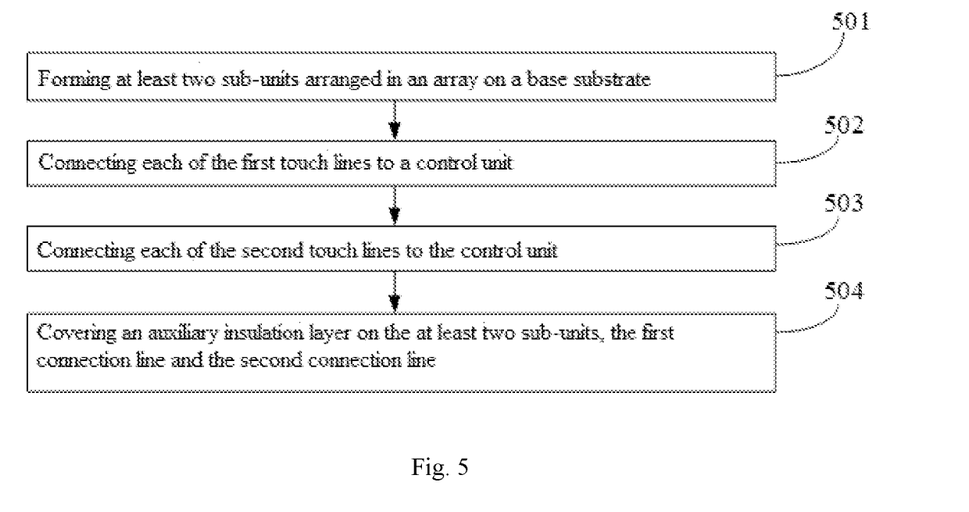
FIG. 5 is another flow chart of a method for manufacturing a touch unit according to an embodiment of the present disclosure.

As shown in FIG. 5, an embodiment of the present disclosure provides another method for manufacturing a touch unit. The method for manufacturing the touch unit may include following steps.

Step 501: at least two sub-units arranged in an array are formed on a base substrate.

It should be noted that, before step 501, the base substrate may be cleaned. For example, a conventional cleaning method, such as roller brushing, disc brushing, lotion showering, and pure water showering is adopted to clean a surface of the base substrate, to remove dirt on the surface of the glass substrate.

Exemplarily, the at least two sub-units arranged in an array may be formed on the base substrate by adopting following two manners in step 501.

Figure 6A:
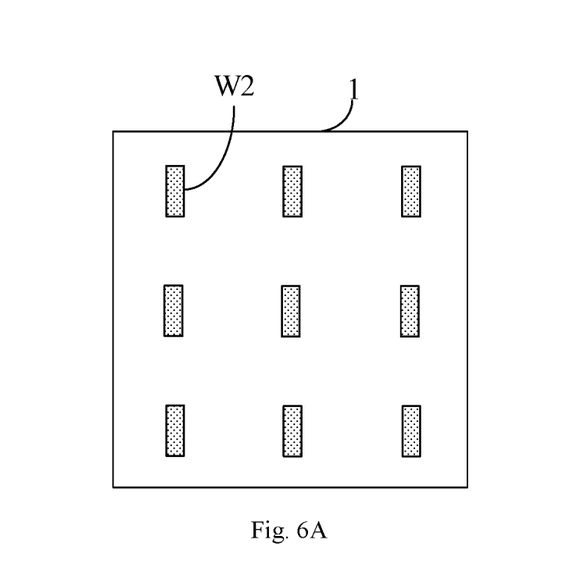
FIG. 6A is a partial schematic structural diagram of a touch unit according to an embodiment of the present disclosure.
Figure 6B:
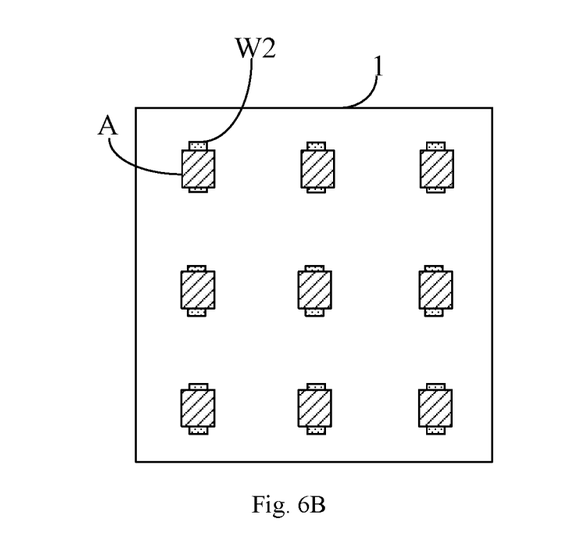
FIG. 6B is another partial schematic structural diagram of a touch unit according to an embodiment of the present disclosure.
Figure 6C:
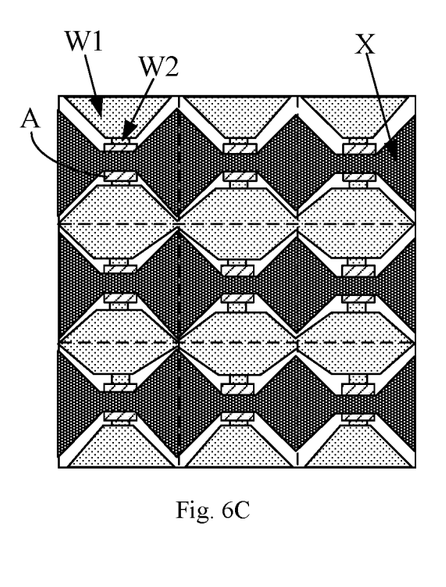
FIG. 6C is a yet another partial schematic structural diagram of a touch unit according to an embodiment of the present disclosure.

In one aspect, as shown in FIG. 6A, a conductive bridge pattern may be formed on a base substrate 1 firstly. The conductive bridge pattern may include n conductive bridges W2, wherein n may be an integer greater than or equal to 2. For example, the conductive bridge pattern may include nine conductive bridges W2. Exemplarily, the conductive bridge pattern may be formed on the base substrate by a single patterning process. Specifically, the single patterning process may include steps of coating, exposing, developing, etching, and stripping. As shown in FIG. 6B, after the n conductive bridges W2 are formed on the base substrate, initial insulation layers A may be formed on the base substrate 1 having n conductive bridges W2 formed thereon. Specifically, the initial insulation layers A may be formed on the base substrate 1 by a single patterning process, so that the initial insulation layers A may cover all the conductive bridges W2. As shown in FIG. 6C, after the initial insulation layers A are formed on the base substrate, an electrode pattern may be formed on the base substrate on which the initial insulation layers A is formed. For example, the electrode pattern may include n first electrodes X and 2n second sub-electrodes W1. Each of the first electrodes X corresponds to one conductive bridge W2 and two second sub-electrodes W1 respectively. In the embodiment, a preset first electrode is any one of the n first electrodes X, the preset first electrode respectively corresponds to a preset conductive bridge and two preset second sub-electrodes, and the two preset second sub-electrodes are respectively located at two sides of the preset first electrode, and two ends of the preset conductive bridge are respectively connected to the two preset second sub-electrodes and form a preset second electrode. It should be noted that the materials of the first electrode, the second sub-electrode and the conductive bridge may be the same, and the first electrode and the second sub-electrode may be formed by a single patterning process.

Figure 7A:
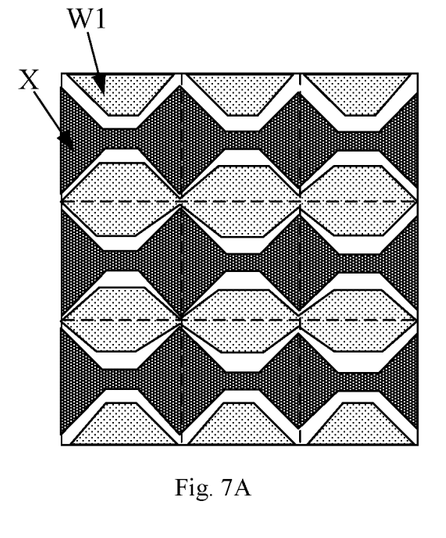
FIG. 7A is a partial schematic structural diagram of a touch unit according to another embodiment of the present disclosure.
Figure 7B:
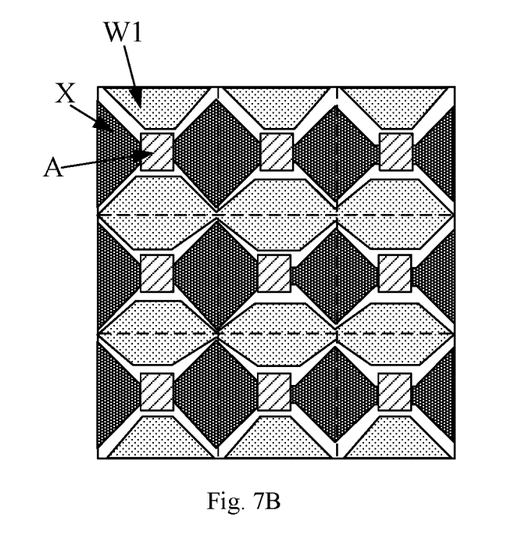
FIG. 7B is another partial schematic structural diagram of a touch unit according to another embodiment of the present disclosure.
Figure 7C:
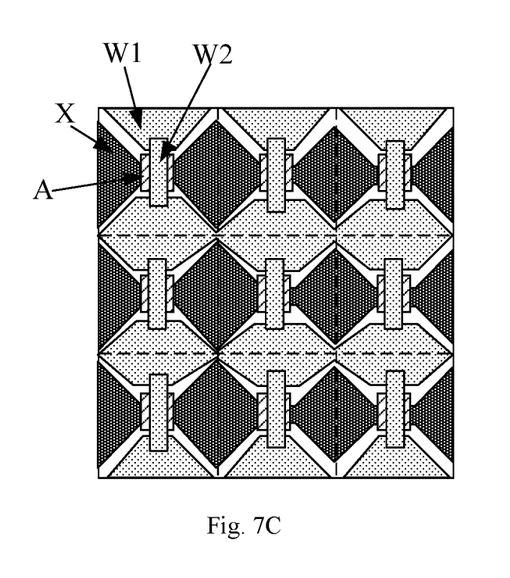
FIG. 7C is a yet another partial schematic structural diagram of a touch unit according to yet another embodiment of the present disclosure.

On the other hand, as shown in FIG. 7A, an electrode pattern may be formed on a base substrate. The electrode pattern may include n first electrodes X and 2n second sub-electrodes W1. Each of the first electrodes X corresponds to two of the second sub-electrodes W1, wherein n may be an integer greater than or equal to 2. As shown in FIG. 7B, after the electrode pattern is formed, initial insulation layers A may be formed on the base substrate on which the electrode pattern is formed. As shown in FIG. 7C, after the initial insulation layers A are formed, a conductive bridge pattern may be formed on the base substrate on which the initial insulation layers A are formed. The conductive bridge pattern may include n conductive bridges W2 and the n conductive bridges W2 corresponds to the n first electrodes X one-to-one. In the embodiment, a preset first electrode is any one of the n first electrodes, the preset first electrode respectively corresponds to a preset conductive bridge and two preset second sub-electrodes, and the two preset second sub-electrodes are respectively located at two sides of the preset first electrode, and two ends of the preset conductive bridge are respectively connected to the two preset second sub-electrodes and form a preset second electrode.

Exemplarily, the touch unit formed in step 501 may include: nine sub-units arranged in an array on the base substrate, and the nine sub-units are arranged in three rows and three columns. That is, the nine sub-units may include three rows of sub-units and three columns of sub-units. The touch unit 01 may have an area of 25 mm$^2$ (square millimeter). That is, the touch unit may be a square with a side length of 5 mm (millimeter).

Each of the sub-units formed in step 501 may include: a first electrode and a second electrode formed on the base substrate, an initial insulation layer being formed between the first electrode and the second electrode, wherein an orthographic projection area of the first electrode on the second electrode is located within an orthographic projection area of the initial insulation layer on the second electrode, the first electrodes in each row of the sub-units are sequentially connected to form a first touch line, and the second electrodes in each column of the sub-units are sequentially connected to form a second touch line. In the embodiment of the present disclosure, a lengthwise direction of the first electrode may have an included angle with a lengthwise direction of the second electrode, so that the first electrode has an orthographic projection area on the second electrode (that is, an orthographic projection area of the first electrode on a plane where the second electrode is located is located on the second electrode). In an embodiment, the lengthwise direction of the first electrode is perpendicular to the lengthwise direction of the second electrode. That is, the included angle between the lengthwise direction of the first electrode and the lengthwise direction of the second electrode is 90 degrees.

Specifically, each of the first electrode, the conductive bridge and the second sub-electrode in the touch unit formed in step 501 may include a transparent conductive material. For example, the materials of the first electrode and the second electrode may be ITO, Metal Mesh, or graphene. The material of the conductive bridge may be ITO or ZnO. Each of the first electrode and the second electrode may have a thickness of 200 Å (angstroms) to 1500 Å. It should be noted that 1 Å is equal to $10^{-10}$ m. The initial insulation layer may have a thickness of 1.5 μm to 2.5 μm.

Step 502: each of the first touch lines is connected to a control unit.

Exemplarily, the control unit in the embodiment of the present disclosure may be the same as the Bonding lead in the related art. After at least two sub-units are formed on the base substrate, a single patterning process may be adopted to form a first connection line on the base substrate having the at least two sub-units formed thereon. The first connection line connects one end of each first touch line to the control unit. For example, the material of the first connection line may be metal, such as copper, aluminum or aluminum alloy. The first connection line may have a thickness of 1000 Å to 4000 Å.

Step 503: each of the second touch lines is connected to the control unit.

After at least two sub-units are formed on the base substrate, a second connection line may be formed on the base substrate on which the at least two sub-units are formed through a single patterning process. The second connection line connects one end of each second touch line to the control unit connection. For example, the material of the second connection line may be metal, such as copper, aluminum or aluminum alloy. The second connection line may also have a thickness of 1000 Å to 4000 Å.

Step 504: an auxiliary insulation layer is covered on the at least two sub-units, the first connection line and the second connection line.

After the first electrode, the conductive bridge, the second sub-electrode, the first connection line and the second connection line are formed on the base substrate, the auxiliary insulation layer may be further coated on the at least two sub-units, the first connection line and the second connection line through coating or sputtering.

Since the touch unit further includes the auxiliary insulation layer and the auxiliary insulation layer is covered on the at least two sub-units, the first connection line and the second connection line, the auxiliary insulation layer may play a protective role for the at least two sub-units, the first connection line and the second connection line. The material of the auxiliary insulation layer may be an organic coating, such as the same material as the OC, or the material of the auxiliary insulation layer may also be an inorganic material, such as $SiO_2$.

Generally, an OGS touch display panel is widely used due to its good touch performance, light weight and thinning. A finger or a touch pen may be used on the touch display panel for touch, and it is more and more popular among people to use the touch pen to perform touch on the touch display panel. However, since a tip of the touch pen is thin, a contact area of the tip of the touch pen with the touch display panel is a circle with a diameter less than 2 mm. Therefore, an area corresponding to each electrode intersection point in this case is required to be smaller, which generally may be a circle with a diameter less than 4 mm. In addition, generally, only one first electrode and one second electrode are included in one touch unit. That is, one touch unit only includes one electrode intersection point. When the first electrode and the second electrode fail, the region on the touch display panel corresponding to the touch unit cannot achieve effective touch. However, the touch unit provided by the embodiment of the present disclosure includes at least two sub-units. That is, the touch unit includes at least two electrode intersection points. When a certain sub-unit fails, other sub-units may still operate normally, and the region on the touch display panel corresponding to the touch unit may still achieve effective touch.

To sum up, embodiments of the present disclosure provide a method for manufacturing a touch unit. The touch unit manufactured by the method includes at least two sub-units. Each of the sub-units includes a first electrode and a second electrode. An initial insulation layer is formed between the first electrode and the second electrode. Each of the first touch lines and each of the second touch lines are connected to a control unit. The number of intersection points of the first electrode and the second electrode in the touch unit is increased, and the number of electrodes capable of generating an induced voltage in the touch unit is increased. When a region except a certain electrode intersection point within the region where the touch unit is located is touched, the induced voltage generated on an electrode at other electrode intersection point is different from the preset voltage. The induced voltage collected from the touch sensing line is different from the preset voltage, so that the touch may be effectively performed and the accuracy of the touch is improved.

Those skilled in the art may clearly understand that, for convenience and brevity of description, the touch unit embodiment, the method embodiment for manufacturing the touch unit, and the touch display panel embodiment described above may be referred to each other, which will not be repeated by the embodiments of the present disclosure herein.

The above is only the preferred embodiments of the present disclosure and is not intended to limit the present disclosure. Any modification, equivalent substitution, improvement or the like within the spirit and principle of the present disclosure should be included within the protection scope of the present disclosure.

What is claimed is:

1. A touch unit, comprising: at least two sub-units arranged in an array on a base substrate,
   each of the sub-units comprising: a first electrode and a second electrode formed on the base substrate, an initial insulation layer being formed between the first electrode and the second electrode, wherein an orthographic projection area of the first electrode on the second electrode is located within an orthographic projection area of the initial insulation layer on the second electrode,
   wherein the first electrodes in each row of the sub-units are sequentially connected to form a first touch line, the second electrodes in each column of the sub-units are sequentially connected to form a second touch line,
   wherein the touch unit comprises at least two of the first touch lines and at least two of the second touch lines,
   wherein the at least two of the first touch lines are connected to a control unit through a same first connection line, and the at least two of the second touch lines are connected to the control unit through a same second connection line,
   wherein the same first connection line is directly connected to the at least two of the first touch lines and the control unit, and
   the same second connecting line is directly connected to the at least two of the second touch lines and the control unit.

2. The touch unit according to claim 1, wherein a lengthwise direction of the first electrode is perpendicular to a lengthwise direction of the second electrode.

3. The touch unit according to claim 1, wherein, the first connection line and the second connection line are formed on the base substrate,
   wherein one end of each of the first touch lines in the touch unit is connected to the control unit through the first connection line, and one end of each of the second touch lines in the touch unit is connected to the control unit through the second connection line.

4. The touch unit according to claim 1, wherein the second electrode comprises:
   two second sub-electrodes and a conductive bridge, the two second sub-electrodes being respectively located at two sides of the first electrode and respectively connected to two ends of the conductive bridge.

5. The touch unit according to claim 4, wherein each of the first electrode, the conductive bridge and the second sub-electrode comprises a transparent conductive material.

6. The touch unit according to claim 3, comprising: nine sub-units arranged in an array on the base substrate, the nine sub-units being arranged in three rows and three columns.

7. The touch unit according to claim 6, wherein the touch unit has an area of 25 mm$^2$.

8. The touch unit according to claim 6, wherein each of the first electrode and the second electrode has a thickness of 200 Å to 1500 Å.

9. The touch unit according to claim 6, wherein the initial insulation layer has a thickness of 1.5 um to 2.5 um.

10. The touch unit according to claim 6, wherein each of the first connection line and the second connection line has a thickness of 1000 Å to 4000 Å.

11. A touch display panel, comprising: a base substrate, and a plurality of touch units formed in an array on the base substrate,
    wherein the touch unit comprises at least two sub-units arranged in an array on the base substrate,
    wherein each of the sub-units comprises: a first electrode and a second electrode formed on the base substrate, an initial insulation layer being formed between the first electrode and the second electrode, wherein an orthographic projection area of the first electrode on the second electrode is located within an orthographic projection area of the initial insulation layer on the second electrode,
    wherein the first electrodes in each row of the sub-units are sequentially connected to form a first touch line, the second electrodes in each column of the sub-units are sequentially connected to form a second touch line,
    wherein the touch unit comprises at least two of the first touch lines and at least two of the second touch lines,
    wherein the at least two of the first touch lines are connected to a control unit through a same first connection line, and the at least two of the second touch lines are connected to the control unit through a same second connection line,
    wherein the same first connection line is directly connected to the at least two of the first touch lines and the control unit, and
    the same second connection line is directly connected to the at least two of the second touch lines and the control unit.

12. A method for manufacturing a touch unit, comprising:
    forming at least two sub-units arranged in an array on a base substrate, each of the sub-units comprising: a first electrode and a second electrode formed on the base substrate, an initial insulation layer being formed between the first electrode and the second electrode, wherein an orthographic projection area of the first electrode on the second electrode is located within an orthographic projection area of the initial insulation layer on the second electrode, the first electrodes in each row of the sub-units are sequentially connected to form a first touch line, and the second electrodes in each column of the sub-units are sequentially connected to form a second touch line, and wherein each of the touch units comprises at least two of the first touch lines and at least two of the second touch lines;
    connecting the at least two of the first touch lines to a control unit through a same first connection line; and
    connecting the at least two of the second touch lines to the control unit through a same second connection line,
    wherein the same first connection line is directly connected to the at least two of the first touch lines and the control unit, and the same second connection line is directly connected to the at least two of the econd touch lines and the control unit.

13. The method according to claim 12, wherein a lengthwise direction of the first electrode is perpendicular to a lengthwise direction of the second electrode.

14. The method according to claim 12, wherein the step of forming at least two sub-units arranged in an array on a base substrate comprises:
   forming a conductive bridge pattern on the base substrate, the conductive bridge pattern comprising n conductive bridges, n being an integer greater than or equal to 2;
   forming the initial insulation layers on the base substrate on which the n conductive bridges are formed; and
   forming an electrode pattern on the base substrate on which the initial insulation layers are formed, the electrode pattern comprising n first electrodes and $2n$ second sub-electrodes, each of the first electrodes corresponding to one conductive bridge and two second sub-electrodes respectively,
   wherein each of the sub-units comprises one first electrode, one conductive bridge and two second sub-electrodes, the two second sub-electrodes are respectively located at two sides of the one first electrode, and two ends of the one conductive bridge are respectively connected to the two second sub-electrodes to form a preset second electrode.

15. The method according to claim 12, wherein the step of forming at least two sub-units arranged in an array on a base substrate comprises:
   forming an electrode pattern on the base substrate, the electrode pattern comprising n first electrodes and $2n$ second sub-electrodes, each of the first electrodes corresponding to two of the second sub-electrodes, n being an integer greater than or equal to 2;
   forming the initial insulation layers on the base substrate on which the electrode pattern is formed; and
   forming a conductive bridge pattern on the base substrate on which the initial insulation layers are formed, the conductive bridge pattern comprising n conductive bridges and the n conductive bridges corresponding to the n first electrodes respectively,
   wherein each of the sub-units comprises one first electrode, one conductive bridge and two second sub-electrodes, the two second sub-electrodes are respectively located at two sides of the one first electrode, and two ends of the one conductive bridge are respectively connected to the two second sub-electrodes to form a preset second electrode.

16. The method according to claim 12, wherein the connecting the at least two of the first touch lines to a control unit through a same first connection line comprises:
   forming the first connection line on the base substrate on which the at least two sub-units are formed, to connect one end of each of the first touch lines to the control unit; and
   the connecting the at least two of the second touch lines to the control unit through a same second connection line comprises:
   forming the second connection line on the base substrate on which the at least two sub-units are formed, to connect one end of each of the second touch lines to the control unit.

17. The method according to claim 12, wherein the step of forming at least two sub-units arranged in an array on a base substrate comprises:
   forming nine sub-units arranged in an array on the base substrate, the nine sub-units being arranged in three rows and three columns.

18. The touch display panel according to claim 11, wherein the first connection line and the second connection line are formed on the base substrate,
   wherein one end of each of the first touch lines in the touch unit is connected to the control unit through the first connection line, and one end of each of the second touch lines in the touch unit is connected to the control unit through the second connection line.

\* \* \* \* \*